(12) United States Patent
Axtell et al.

(10) Patent No.: US 9,639,345 B2
(45) Date of Patent: May 2, 2017

(54) METHODS AND APPARATUSES FOR PROVIDING FRAMEWORK FOR SELECTIVE EXECUTION OF APPLICATION FEATURES

(71) Applicant: McKesson Financial Holdings, Hamilton (BM)

(72) Inventors: Rachel B. Axtell, Northampton, MA (US); James Rutter, Amherst, MA (US)

(73) Assignee: Change Healthcare LLC, San Francisco, CA (US)

(*) Notice: Subject to any disclaimer, the term of this patent is extended or adjusted under 35 U.S.C. 154(b) by 0 days.

(21) Appl. No.: 14/674,256

(22) Filed: Mar. 31, 2015

(65) Prior Publication Data

US 2016/0291955 A1    Oct. 6, 2016

(51) Int. Cl.
  *G06F 9/44*    (2006.01)
  *G06F 9/445*   (2006.01)
  *G06F 21/00*   (2013.01)
(52) U.S. Cl.
  CPC ............ *G06F 8/65* (2013.01); *G06F 9/44505* (2013.01); *G06F 21/00* (2013.01)

(58) Field of Classification Search
  None
  See application file for complete search history.

(56) References Cited

U.S. PATENT DOCUMENTS 7,315,826 B1 *  1/2008  Guheen ............... G06F 17/3089
                                                        703/27

* cited by examiner

*Primary Examiner* — Chuck Kendall
(74) *Attorney, Agent, or Firm* — Alston & Bird LLP (57) ABSTRACT

A method, apparatus and computer program product are provided in order to provide a framework for selective enablement of application features. An example of the method includes receiving, via an electronic communications interface, client credential information indicating at least one user or client facility, executing a first instance of an application by a processor, the first instance of the application comprising at least one feature selectively enabled or disabled by the framework, determining, during execution of the first instance of the application, a feature identifier associated with the at least one feature, retrieving feature information from a client feature table using at least the client credential information, determining whether the at least one feature is enabled for the at least one user or client facility, and, in response to determining that the at least one feature is enabled for the at least one user or client facility, executing the at least one feature.

20 Claims, 4 Drawing Sheets

METHODS AND APPARATUSES FOR PROVIDING FRAMEWORK FOR SELECTIVE EXECUTION OF APPLICATION FEATURES

TECHNOLOGICAL FIELD

Example embodiments of the present invention relate generally to methods and devices enabling application features and, more particularly, to methods and apparatuses for providing a framework for selective execution of application features.

BACKGROUND

As applications are updated to provide new features and bug fixes, it is common for certain features to be offered on a provisional or "beta" basis for testing and evaluation purposes or to perform performance tuning of existing features. Offering these features in a selective manner allows users to experience the new features before the official release of the new software version, and developers may be provided with test data of how the features operate under real-world conditions. However, not all users may desire access to untested features, and not all beta features of a given software product may be applicable to every user's particular installation. Particularly, in the case of web-based applications that support multiple users and facilities, providing access to new beta features to some users but not others may require multiple separate code installations reflecting different feature sets for different users, facilities, and the like. Some execution environments may also not allow multiple different versions of a given application to run simultaneously on shared software and hardware resources.

Through applied effort, ingenuity, and innovation, Applicant has solved many of these identified problems by developing a technical solution that is embodied by the present invention, which is described in detail below.

BRIEF SUMMARY

Methods, apparatuses and computer program products are therefore provided according to example embodiments of the present invention in order to implement a framework for selective execution of application features. Embodiments include a method for providing a framework for selective enablement of application features. The method includes receiving, via an electronic communications interface, client credential information indicating at least one user or client facility, executing a first instance of an application by a processor, the first instance of the application comprising at least one feature selectively enabled or disabled by the framework, determining, during execution of the first instance of the application, a feature identifier associated with the at least one feature, retrieving feature information from a client feature table using at least the client credential information, determining, based on the feature identifier and the feature information, whether the at least one feature is enabled for an application execution context associated with the at least one user or client facility, and in response to determining that the at least one feature is enabled for the at least one user or client facility, causing the at least one feature to be executed.

The method may also include retrieving metadata information associated with the feature from a feature metadata table, determining a column of the client feature table based at least in part on the feature metadata, and accessing data stored in the column of the client feature table when determining whether the at least one feature is enabled for the at least one user or client facility. The method may include retrieving metadata information associated with the feature from a feature metadata table, determining, based upon the metadata information, that the feature is not a beta feature, and executing the at least one feature in response to determining that the at least one feature is not a beta feature. The method may include determining, a first time, whether the at least one feature is enabled during execution of the first instance of the application, where a first result of the determining is that the feature is not enabled, disabling the feature in response to determining that the feature is not enabled during execution of the first instance of the application, and determining, a second time, whether the at least one feature is enabled during execution of the first instance of the application, where a second result of the determining is that the feature is enabled. The client facility may be a healthcare facility. The method may include editing the client feature table to enable or disable the at least one feature without rebuilding the application. The method may include editing, by a testing component, the client feature table to enable the at least one feature for the first instance of the application, editing, by the testing component, the client feature table to disable the at least one feature for a second instance of the application, and executing the second instance of the application such that the at least one feature is disabled for the second instance of the application.

Embodiments also include an apparatus for providing a framework for selective enablement of application features. The apparatus includes application circuitry and feature management circuitry. The application circuitry is configured to execute a first instance of an application, the first instance of the application includes at least one feature selectively enabled or disabled by the framework. The feature management circuitry is configured to receive, via an electronic communications interface, client credential information indicating at least one user or client facility, determine, during execution of the first instance of the application, a feature identifier associated with the at least one feature, retrieve feature information from a client feature table using at least the client credential information, determine, based on the feature identifier and the feature information, whether the at least one feature is enabled for an application execution context associated with the at least one user or client facility, and, in response to determining that the at least one feature is enabled for the at least one user or client facility, cause the at least one feature to be executed.

The feature management circuitry may be further configured to retrieve metadata information associated with the feature from a feature metadata table, determine a column of the client feature table based at least in part on the feature metadata, and access data stored in the column of the client feature table when determining whether the at least one feature is enabled for the at least one user or client facility. The feature management circuitry may be further configured to retrieve metadata information associated with the feature from a feature metadata table, determine, based upon the metadata information, that the feature is not a beta feature, and execute the at least one feature in response to determining that the at least one feature is not a beta feature. The feature management circuitry may be further configured to determine, a first time, whether the at least one feature is enabled during execution of the first instance of the application, where a first result of the determining is that the feature is not enabled, disable the feature in response to determining that the feature is not enabled during execution of the first instance of the application, and determine, a second time, whether the at least one feature is enabled during execution of the first instance of the application, where a second result of the determining is that the feature is enabled. The client facility may be a healthcare facility. The feature management circuitry may be further configured to edit the client feature table to enable or disable the at least one feature without rebuilding the application. The apparatus may include testing circuitry configured to edit the client feature table to enable the at least one feature for the first instance of the application, edit the client feature table to disable the at least one feature for a second instance of the application, and execute the second instance of the application such that the at least one feature is disabled for the second instance of the application.

Embodiments may also include a non-transitory computer readable storage medium comprising instructions that, when executed by a processor, configures a processor. The processor is configured to receive client credential information indicating at least one user or client facility, execute a first instance of an application, the first instance of the application comprising at least one feature selectively enabled or disabled by the framework, determine, during execution of the first instance of the application, a feature identifier associated with the at least one feature, retrieve feature information from a client feature table using at least the client credential information, determine, based on the feature identifier and the feature information, whether the at least one feature is enabled for an application execution context associated with the at least one user or client facility, and, in response to determining that the at least one feature is enabled for the at least one user or client facility, cause the at least one feature to be executed.

The instructions may also configure the processor to retrieve metadata information associated with the feature from a feature metadata table, determine a column of the client feature table based at least in part on the feature metadata, and access data stored in the column of the client feature table when determining whether the at least one feature is enabled for the at least one user or client facility. The instructions may configure the processor to retrieve metadata information associated with the feature from a feature metadata table, determine, based upon the metadata information, that the feature is not a beta feature, and execute the at least one feature in response to determining that the at least one feature is not a beta feature. The instructions may also configure the processor to determine, a first time, whether the at least one feature is enabled during execution of the first instance of the application, where a first result of the determining is that the feature is not enabled, disable the feature in response to determining that the feature is not enabled during execution of the first instance of the application, and determine, a second time, whether the at least one feature is enabled during execution of the first instance of the application, where a second result of the determining is that the feature is enabled. The client facility may be a healthcare facility. The instructions may also configure the processor to edit the client feature table to enable or disable the at least one feature without rebuilding the application.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Introduction and Definitions

A method, apparatus and computer program product are provided in accordance with example embodiments of the present invention to provide a framework for selective execution of application features. As noted above, the inventors have identified that current systems for code deployment and application execution fail to provide straightforward, flexible enabling and disabling of particular application features on a installation or per-client-product basis. In this regard, the inventors have developed novel systems and techniques for storing information related to particular application features, for enabling features for particular installations or client-products, for executing applications based on the stored information to control which users receive access to which features, and for deploying features to all users once a feature has been tested, validated, and/or verified. The inventors have also developed novel systems for testing of application features using a selective execution framework that allow for an apples-to-apples comparison of application performance.

To support this novel functionality, the inventors have developed various novel data structures, functions, algorithms, databases, libraries, and the like that allow for selective execution of particular application features. These assets may implement, for example, wrapper functions within application code for determining whether to execute a particular beta feature, table lookups to data tables containing information about which features are enabled for a particular application, user, or client facility, or the like. In some embodiments, an application programming interface (API) may be implemented for identifying whether particular features should be enabled, for accessing and updating data tables associated with identifying enabled features, and for identifying particular features as to be enabled for all users, as opposed to a subset of all users. Some embodiments may also implement various graphical user interfaces (GUIs) for interacting with sets of features, detecting which features are enabled for which users, viewing information or metadata about particular features, or the like.

For the purposes of this disclosure, the terms "feature" and "application feature" refer to sections of application code that are wrapped by a particular set of wrapper functions that use data structures (e.g., tables) as defined herein for the purpose of determining whether to execute code located within or between those wrapper functions. For example, a feature may include a set of code contained within an "if/then" statement that queries a data table as described herein as the criteria of the "if" statement, such that the code contained within the "then" portion of the statement comprises the feature.

For the purposes of this disclosure, the term "beta" and "beta feature" refer to a particular feature that is not part of a default installation or execution path of a given code base. For example, beta features typically include features that are newly implemented and still being reviewed under various testing and validation protocols. Such features may be provided to users for optional execution for testing and evaluation purposes. Embodiments include functionality to modify data associated with a particular feature to indicate that the feature is or is not a beta feature. For example, upon determination that sufficient testing has occurred, embodiments may mark a given feature as no longer a beta feature, such that the feature becomes part of the default execution path of the application. Some embodiments include a capability to change the status of a given feature in this manner without having to recompile or rebuild the application.

For the purposes of this disclosure, the term "feature information" refers to electronic data indicating one or more of metadata associated with a particular feature and whether a particular feature is enabled or disabled for a particular application execution context.

For the purposes of this disclosure, the term "application execution context" refers to a particular application installation and/or client-product being accessed for a particular user and/or facility that enables a particular set of features. A given application may include a single process during execution, but the interaction with multiple users with multiple different feature sets being enabled may result in that application having a plurality of application execution contexts. Some embodiments of the instant invention provide for such functionality by determining whether a particular feature is to be enabled or disabled during execution of the application rather than beforehand, such that a single application process may enable some installations or client-products of an application, but not others. The application execution context may include, for example, a particular user or client facility's interaction with a particular application process, a particular process launched for the particular user or client facility, or any other association between a particular application operating within the framework for selective enablement of application features and a particular user or client facility, such that particular features are enabled within the application execution context but selectively disabled within other application execution contexts, or vice-versa.

For the purposes of this disclosure, the term "client credential information" includes electronic data sufficient to identify a particular user, group of users, and/or client facility included within a client feature table for association with a particular set of features that are enabled or disabled for the particular user, group of users, or client facility. The client credential information may include, for example, electronic data sufficient to identify a particular user and/or client facility for association with a particular application execution context, such as a user name, Internet Protocol (IP) address, a facility identifier, an internal identifier (e.g., a table index in a user table), or the like.

For the purposes of this disclosure, the term "client facility" refers to a particular client location associated with a particular application. For example, a client facility may be a healthcare organization (HCO) including a group of individual medical practices, a single entity (e.g., a hospital), or a particular entity within a HCO (e.g., an operating room, an emergency room, a cardiology unit, a radiology unit, an electronic health records datastore, an admit-discharge-transfer (ADT) system, or the like). It should also be appreciated that, while instant example embodiments may be described with respect to healthcare organizations, embodiments may be equally applicable to various other fields of use, including but not limited to e-commerce, digital media content delivery systems, social network sites, or any other multi-tenant system where it is desirable to implement certain application features for some users or client facilities but not others.

As used herein, the term "installation" shall be understood to refer to a dynamically generated instance of a particular application sub-type. Multiple application installations may be employed in a multi-tenant, multi-application environment, such that an arbitrary number of installations exists depending upon the needs of the clients of the multi-tenant multi-application environment. Embodiments may advantageously selectively enable or disable features for particular installations. The term "client-product" is intended to refer to a particular instance of a given application installation.

Example Client Apparatus

Figure 1:
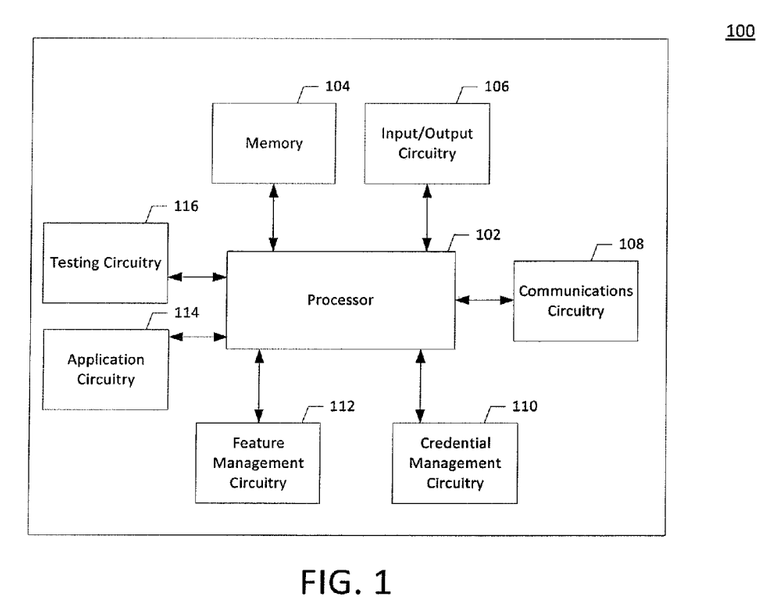
FIG. 1 is a block diagram of an apparatus for providing a framework for selective execution of application features that may be specially configured in accordance with example embodiments of the present invention.

FIG. 1 illustrates a block diagram of an apparatus 100 in accordance with some example embodiments. The apparatus 100 may be any computing device capable of establishing a framework for selective enabling of application features as described herein. For example, the apparatus 100 may be implemented as any device capable of generating a set of data tables comprising information about particular features, accessing said data tables to provide feature information to an application. In some embodiments, the apparatus 100 further executes an application, while in other embodiments the application may be executed remotely. For the purposes of brevity, the apparatus 100 is described as both implementing the various tables and data structures for establishing the framework for selective feature execution and for executing the application itself, though it should be appreciated that such functionality could be split into any number of separate devices. In this regard, the apparatus 100 may be implemented as a standalone or rack-mounted server, a desktop computer, a laptop computer, a personal digital assistant, a tablet computer, a netbook computer, a picture archiving and communication system (PACS) workstation, or the like. Accordingly, it will be appreciated that the apparatus 100 may comprise an apparatus configured to implement and/or otherwise support implementation of various example embodiments described herein.

It should be noted that the components, devices or elements illustrated in and described with respect to FIG. 1 below may not be mandatory and thus some may be omitted in certain embodiments. Additionally, some embodiments may include further or different components, devices or elements beyond those illustrated in and described with respect to FIG. 1.

As illustrated in FIG.1, an apparatus 100 may include a processor 102, a memory 104, input/output circuitry 106, communications circuitry 108, credential management circuitry 110, feature management circuitry 112, application circuitry 114, and testing circuitry 116. The apparatus 100 may be configured to execute the operations described below with respect to FIGS. 2-4. Although these components 102-116 are described with respect to functional limitations, it should be understood that the particular implementations necessarily include the use of particular hardware. It should also be understood that certain of these components 102-116 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 100 may provide or supplement the functionality of particular circuitry. For example, the processor 102 may provide processing functionality, the memory 104 may provide storage functionality, the communications circuitry 108 may provide network interface functionality, and the like.

In some embodiments, the processor 102 (and/or co-processor or any other processing circuitry assisting or otherwise associated with the processor) may be in communication with the memory 104 via a bus for passing information among components of the apparatus. The memory 104 may be non-transitory and may include, for example, one or more volatile and/or non-volatile memories. In other words, for example, the memory may be an electronic storage device (e.g., a computer readable storage medium). The memory 104 may be configured to store information, data, content, applications, instructions, tables, data structures, or the like, for enabling the apparatus to carry out various functions in accordance with example embodiments of the present invention.

The processor 102 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 102 may be configured to execute instructions stored in the memory 104 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 100 may include input/output circuitry 106 that may, in turn, be in communication with processor 102 to provide output to the user and, in some embodiments, to receive an indication of a user input. The input/output circuitry 106 may comprise a user interface and may include a display and may comprise a web user interface, a mobile application, a client device, a kiosk, or the like. In some embodiments, the input/output circuitry 106 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 104, and/or the like).

The communications circuitry 108 may be any means such as a device or circuitry embodied in either hardware or a combination of hardware and software that is configured to receive and/or transmit data from/to a network and/or any other device, circuitry, or module in communication with the apparatus 100. In this regard, the communications circuitry 108 may include, for example, a network interface for enabling communications with a wired or wireless communication network. For example, the communications circuitry 108 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The credential management circuitry 110 includes hardware configured to identify a particular user and/or client facility from information provided to the apparatus 100. For example, the credential management circuitry 110 may receive network data including user credentials (e.g., login names, passwords, session information, etc.) or other data sufficient to identify that a given application execution context is associated with a particular user and/or client facility. The credential management circuitry 110 may provide information regarding the identified user and/or client facility to other components of the system (e.g., the feature management circuitry 112 or application circuitry 114) for use in a lookup operation on a data structure to determine which features are associated with the particular identified user and/or client facility.

In some embodiments, the credential management circuitry 110 may be included as part of or embodied within application circuitry, such as described below with respect to the application circuitry 114. It should also be appreciated that, in some embodiments, the credential management circuitry 110 may include a separate processor, specially configured field programmable gate array (FPGA), or application specific interface circuit (ASIC) for associating a particular application execution context with a particular user or client facility. The credential management circuitry 110 is therefore implemented using hardware components of the apparatus configured by either hardware or software for implementing these planned functions.

The feature management circuitry 112 includes hardware configured to access and edit one or more data structures (e.g., data tables), that store feature information indicating which features are enabled for which users and/or client facilities. The feature management circuitry 112 may include various query processing systems, application programming interfaces, and graphical user interfaces for extracting feature information for particular users and/or client facilities, editing feature information for the users and/or client facilities (e.g., enabling or disabling particular features for particular users), adding or editing information for particular features (e.g., adding new features or changing the status of a feature to or from a "beta" state), or the like. Embodiments may store the feature information in a memory, such as the memory 104. The processor 102 may implement the various other functionality of the feature management circuitry 112, though it should also be appreciated that the feature management circuitry 112 may include a separate processor, FPGA, ASIC, or the like. The feature management circuitry 112 is therefore implemented using hardware components of the apparatus configured by either hardware or software for implementing these planned functions.

The application circuitry 114 includes hardware configured to perform a particular function when accessed by a particular user and/or client facility. The application circuitry 114 may include various applications for retrieving data, uploading data, editing data, viewing data, or the like. For example, the application circuitry 114 may implement applications such as multi-tenant hosted web platforms which run instances of application installations with a shared authentication environment. The application circuitry 114 may communicate with the feature management circuitry 112 and/or credential management circuitry 110 to identify particular features that are enabled for a particular application execution context of an application executed by the application circuitry 114. The application circuitry 114 may utilize the processor 102 to perform these functions, though it should also be appreciated that, in some embodiments, the application circuitry 114 may include a separate processor, specially configured FPGA, or ASIC to execute the application. The application circuitry 114 is therefore implemented using hardware components of the apparatus configured by either hardware or software for implementing these planned functions.

The testing circuitry 116 includes hardware configured to execute one or more applications with particular features enabled and/or disabled for the purposes of application testing. For example, the testing circuitry 116 may interface with the application circuitry 114 to generate two application execution contexts (as part of the same process or two different processes) which are identical but for a particular feature or features being enabled for one application context but disabled for the other application context. To this end, the testing circuitry 116 may instruct the application circuitry 114 to generate the two application execution contexts. The testing circuitry 116 may also interface with the feature management circuitry 112 to facilitate enabling and disabling of the particular set of features for each application execution context (e.g., by modifying data tables maintained by the feature management circuitry 112 to enable or disable particular features for particular users or client facilities associated with the test case). The testing circuitry 116 may utilize the processor 102 to perform these tasks, though in some embodiments the testing circuitry 116 may include a separate processor, FPGA, or ASIC from the processor 102. The testing circuitry 116 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Having now described an apparatus configured to implement and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

Example Application Execution Framework Data Flow

Figure 2:
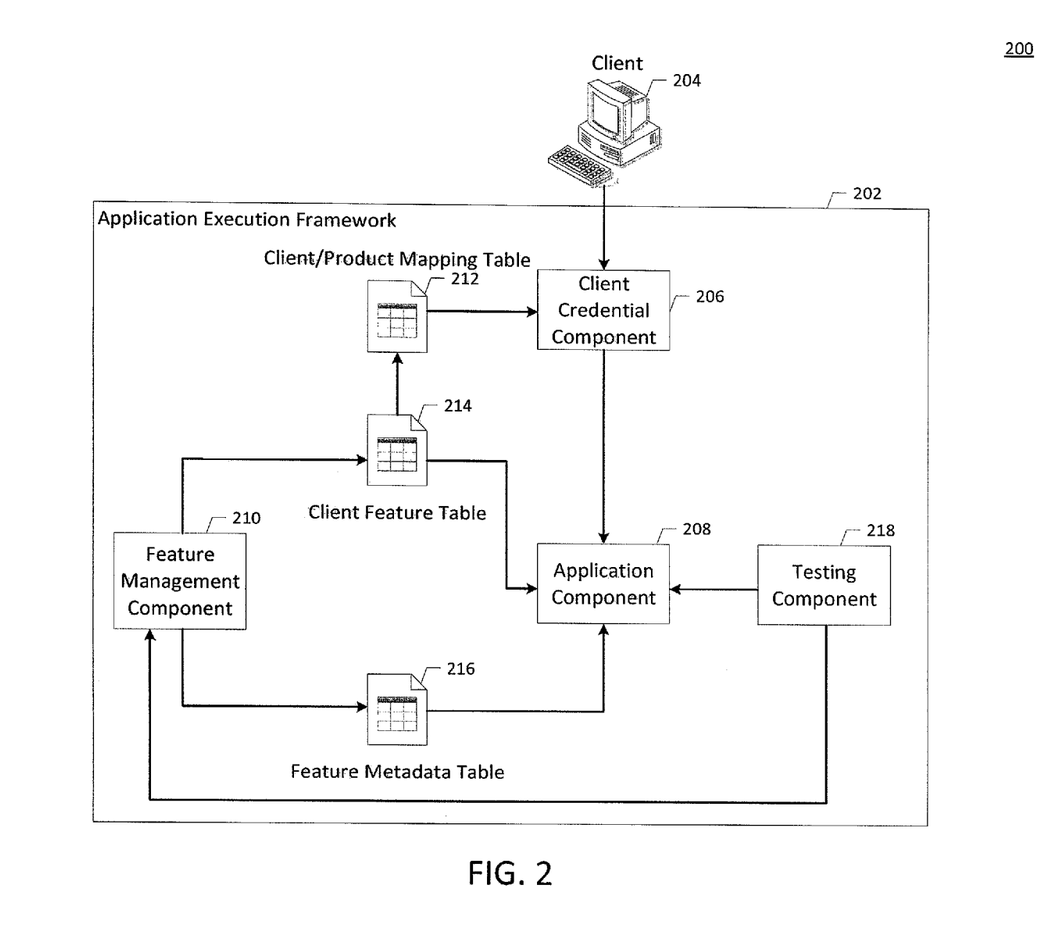
FIG. 2 is a block diagram of a dataflow between logical components of a computing device providing a framework for selective execution of application features in accordance with example embodiments of the present invention.

FIG. 2 is an illustration of an example of a data flow 200 for providing a framework for selectively enabling application features in accordance with example embodiments of the present invention. The data flow 200 illustrates communications between and among components of a framework 202 for selectively enabling application features as described herein. The framework 202 may be in communication with a client 204 to provide the client with access to one or more application features enabled by the framework 202. For example, the framework 202 may include components for determining an identity of a client 204, determining which features are enabled for that client 204, and enabling an application to execute and provide the features identified for the client 204 to the client 204. The framework 202 may include a client credential component 206, an application component 208, a feature management component 210, a client/product mapping table 212, a client feature table 214, a feature metadata table 216, and a testing component 218.

The client credential component 206 may act as a credentialing layer that serves to launch one or more applications that are enabled for a particular client 204. The client credential component may be implemented as, for example, credential management circuitry 110 as described above with respect to FIG. 1. Alternatively, the client credential component 206 may be included within or executed as part of the application component 208. Regardless of the location of the client credential component 206, the client credential component 206 serves to identify which particular user and, in some embodiments, which particular client facility is associated with the client 204. In some embodiments, the client credential component 206 may provide an interface for entering login and password credentials or other authentication mechanisms for identifying a particular user. Upon identification of the user, the client credential component 206 may access the client/product mapping table 212 to determine which applications and/or client facilities are enabled for the user, and provide a selection interface allowing the client to select which application and/or client facility to access. The client credential component 206 may facilitate access to the selected application and/or client facility by enabling the client to interface with the application component 208. It should be appreciated that some users may be associated with multiple client facilities, just as some client facilities may be associated with multiple users. Upon selection of a particular application and/or client facility, the client credential component 206 may launch an associated application component 208 associated with the selection.

The application component 208 may provide the client with various functionalities associated with particular applications. The application component 208 may be implemented, for example, by application circuitry 114 as described above with respect to FIG. 1. As noted above, the functionality provided by the application component may include a variety of different application features surrounded by appropriate wrapper code to communicate with a set of data tables to determine whether to enable those features. As noted above, features may include various bug fixes, interface changes, additional data fields, or the like to be enabled within the application. The framework 202 advantageously provides for enabling or disabling of these features at runtime through the use of a client feature table 214 and a feature metadata table 216.

The client feature table 214 includes feature information that identifies which particular users and/or client facilities are associated with which particular features. The feature metadata table 216 includes information about particular features, such as whether a particular feature is a beta feature or not. For example, the client feature table 214 may be structured as follows:

TABLE 1

| Client/Product Identifier | Feature 1 | Feature 2 | Feature 3 |
|---|---|---|---|
| Client/Product Mapping Identifier | Bit value of 0 or 1 | Bit value of 0 or 1 | Bit value of 0 or 1 |

The client/product identifier field may be indexed by an identifier associated with particular installations as determined by mappings between particular clients and particular products. The identifier may be determined during a credentialing process for accessing the application. The beta feature columns may be bit values that indicate whether each particular feature is enabled or disabled.

The feature metadata table 216 may be structured as follows:

TABLE 2

| Feature Name | Feature Slot | IsBeta |
|---|---|---|
| Name of the Feature | Corresponding Column of Client Feature Table (e.g., 0-2 or 1-3) | Boolean value indicating whether the feature is a beta feature |

The feature metadata table includes a separate row for each feature, with column data identifying the name of the feature, which slot of the client feature table 214 the feature corresponds to, and whether the feature is marked as a beta feature or not.

The client feature table 214 and the feature metadata table 216 may be accessed at run-time. It should be appreciated that these tables may be accessed according to the particular mechanism of the application, such that the tables may be executed in different manners if the application is coded in PHP, TSQL, or various other programming languages. For example, in one embodiment, the application may, upon reaching a code feature that may be selectively executed, first check the feature metadata table 216 to determine whether the code feature is in a beta state by checking the IsBeta value of a row associated with the name of the feature. If the IsBeta value of the table indicates that the feature is not a beta feature, then the code associated with the feature is executed. If the value of IsBeta indicates that the feature is a beta feature, embodiments may access the client feature table 214 to determine whether the feature is enabled for the particular client-product by performing a lookup on the row of the client feature table 214 associated with the particular client-product (e.g., by performing a query on the identifier as determined upon initialization of the application or during a credentialing process).

Upon reaching a portion of code associated with a particular feature, embodiments may access the feature metadata table row associated with the particular feature (e.g., by virtue of a feature name included in a wrapper function wrapping code associated with the feature). A table lookup may be performed on the feature metadata table using the name of the feature, to identify the particular column of the client feature table associated with the feature, along with whether the feature is a beta feature or not. Credential information obtained by the client credential component 206 may be used to identify the appropriate row of the client feature table 214 associated with the instant application execution context (e.g., a mapping between the identity of the user/client facility and the particular application) to determine which features are enabled for that application execution context (e.g., which elements of the appropriate row of the client feature table are a value of 1). If the column of the client feature table 214 corresponding to the "Feature Slot" of the feature identified in the feature metadata table 216 is true, then the code associated with the feature is executed. Alternatively or additionally, if the feature metadata table 216 indicates that the feature is not a beta feature (i.e., the feature should be enabled for all execution paths), then the code may execute even if the corresponding row of the client feature table does not have a value of "1" for the appropriate feature slot.

The feature management component 210 includes functionality for editing and maintaining the client feature table 214 and the feature metadata table 216. The feature management component 210 may be implemented by feature management circuitry 112 as described above with respect to FIG. 1. The feature management component 210 may include APIs, GUIs, and other interfaces for adding new features to the feature metadata table, modifying the feature metadata table to mark particular features as beta features or not, and updating the client feature table to identify particular features for particular clients. Upon adding a new feature to a given application, a user or automated process may utilize the feature management component 210 to edit the feature metadata table to include references to the new feature. In some embodiments, the feature management component 210 is operable to scan source code for newly defined features (e.g., by detecting particular tokens, pre-processor directives, or the like) and automatically add such newly defined features to the feature metadata table, such as during a build phase of the application. In some embodiments, the feature management component 210 may also be employed to automatically enable and/or disable particular features programmatically, such as based on performance metrics, a system-load, system-exceptions, a system health, user-acceptance or other user-input and/or system generated input.

Newly defined features may be automatically associated with columns in the client feature table 214 as well, such as by adding additional columns to the client feature table 214 upon detection of a newly added feature to the feature metadata table 216. In some embodiments, features may be marked by default as "beta" features when added to the feature metadata table 216 by the feature management component 210 until otherwise indicated.

In some embodiments, a testing component 218 may additionally or alternatively interact with the application component 208 to cause execution of a particular application execution context instead of a client device 204. The testing component may be implemented by, for example, testing circuitry 116 as described above with respect to FIG. 1. The testing component 218 may cause two or more execution paths of a given application or group of applications to be executed with different features enabled for testing and validation purposes. The testing component 218 may, for example, establish a first execution path for a first user or client facility associated with a first set of features and a second execution path for a second user or client facility associated with a second set of features. In some embodiments, the same process is used for execution of both execution paths by the testing component, while in other embodiments individual processes are employed for each execution path. Despite the use of different processes, it should be appreciated that the same application builds may be employed for each execution path, such that the application does not need to be recompiled, relinked, or rebuilt to enable or disable the particular features for testing purposes. The testing component may also interact with the client feature table 214 and/or feature management component 210 to enable or disable features for particular users and/or client facilities in order to facilitate testing operations (e.g., by enabling a feature for a first user and disabling a feature for a second user, and then executing the same application for each of the two users as part of a test operation). The testing component 218 may include various monitoring, benchmarking, and analytics functionality for evaluating and comparing the two execution paths to identify performance or functionality changes resulting from enabling or disabling particular features.

Figure 3:
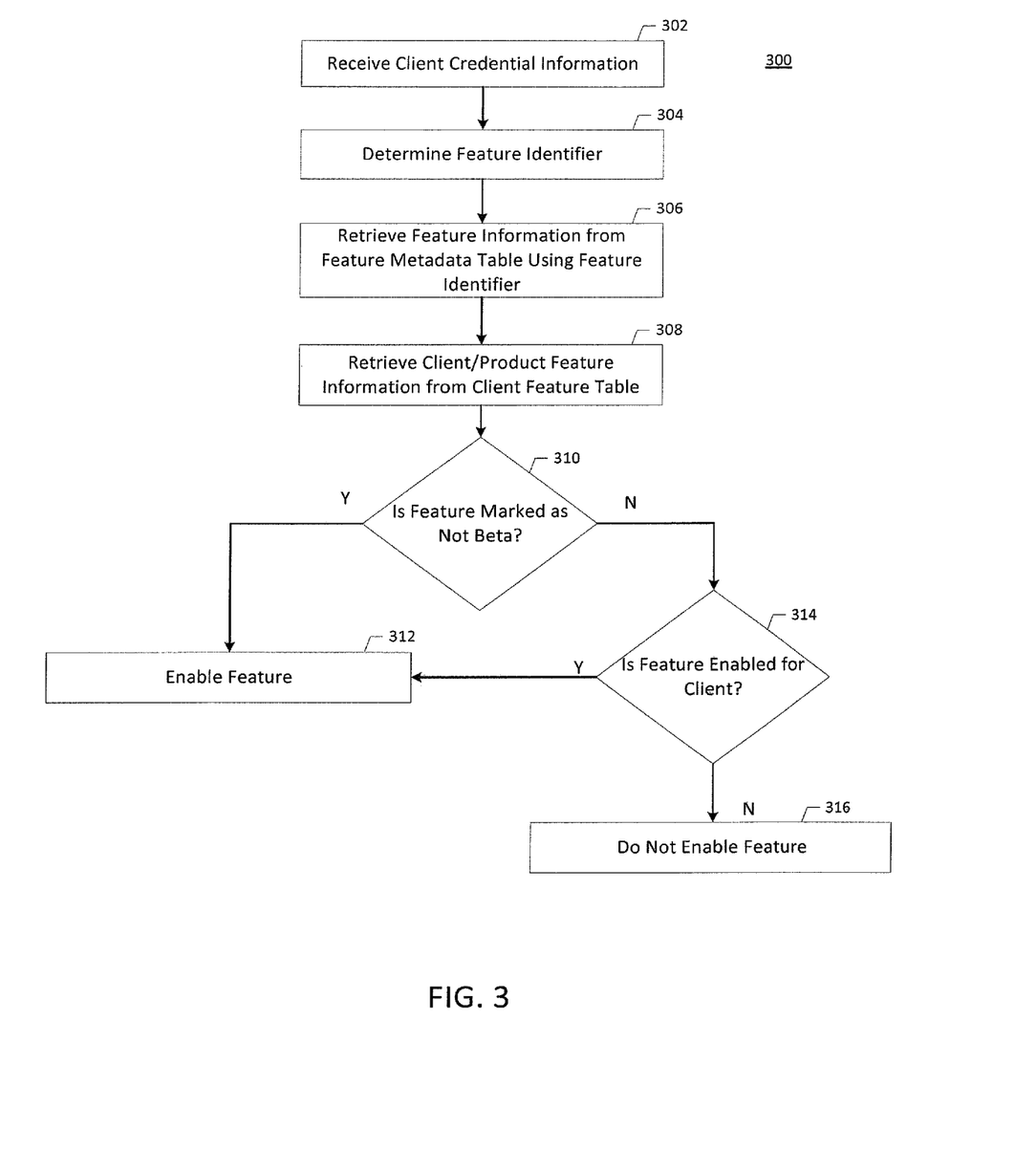
FIG. 3 is an illustration depicting a flow diagram of a process for implementing a framework for selective execution of application features in accordance with example embodiments of the present invention.

Example Processes for Providing a Framework for Selective Enablement of Application Features FIG. 3 is a flow diagram illustrating an example of a process 300 for implementing a framework for selective enablement of application features in accordance with example embodiments of the present invention. The process 300 is operable to determine, at application runtime, whether to enable or disable a particular feature of an application based on whether the feature is identified as a beta feature and/or whether the feature is enabled for a particular user/client facility associated with an application execution context of the application. The process 300 advantageously functions so that features may be enabled or disabled without requiring rebuilding, recompiling, or relinking of the application. The process 300 may be performed, for example, by an apparatus such as the apparatus 100 described above with respect to FIG. 1, through the use of an application execution framework 202 as described above with respect to FIG. 2.

At action 302, client credential information, such as a client-product identifier, is received by the process 300. As noted above, the application execution context may include a particular user or client facility's interaction with a particular application process, a particular process launched for the particular user or client facility, or any other association between a particular application operating within the framework for selective enablement of application features and a particular user or client facility. In some embodiments, the client credential information is a client-product identifier determined by a launcher application (e.g., a performance benchmarking application) or other external application. The client credential information may be provided to the application as part of an application execution or initialization process.

At action 304, a feature identifier is determined. The feature identifier may be determined, for example, by an execution path of an executing application reaching a feature wrapped by appropriate code to determine whether to proceed with executing the feature. Such code may include an identifier that functions as a name or unique identifier for the feature for use in accessing information stored in one or more data tables relating to the feature.

At action 306, feature information may be retrieved from a data table, such as the feature metadata table 216 described above with respect to FIG. 2. The feature information may identify, for example, whether the feature is a beta feature, a particular slot associated with the feature in a client feature table, or the like.

At action 308, feature information from a data table that includes data as to which features are enabled for which clients may be retrieved. The client credential information may be utilized as part of a lookup operation to identify a particular row or data entry of a client feature table, such as the client feature table 214 described above with respect to FIG. 2. For example, the client credential information may be used to perform a mapping between a client/product mapping table (e.g., the client/product mapping table 212 described with respect to FIG. 2) and a client feature table 214 to determine whether the particular user or client facility associated with the credential information has the feature identified at action 304 enabled.

At action 310, a determination is made as to whether the feature is identified as a beta feature or not. If the feature is not identified as a beta feature, then the feature would typically be executed as part of the default code path. As such, the process 300 may proceed to action 312 to enable the feature (e.g., execute the associated code), regardless of whether the particular client has the feature enabled. If the feature is marked as a beta feature (and thus not executable as part of the default code path), then the process 300 may proceed to action 314.

At action 314, a determination is made as to whether the feature is enabled for the client. This determination may be made, for example, by comparing whether a value of a column of the client feature table corresponding to the feature identifier as identified in the feature metadata table is "true" or "1". For example, the feature metadata table may include a column indicating which column of the client feature table the feature is associated with (e.g., the "Feature Slot" column identified in Table 2). A lookup may be performed on the associated column of the client feature table (e.g., the column of the client feature table identified in the "Feature Slot" column) to determine whether the value of that column associated with the particular client is true or false. If the value is true, then the feature is enabled for the client and the process proceeds to action 312 where the feature code is executed. Otherwise, the process proceeds to action 316 and the feature code is not executed. In some embodiments, a failure to enable a particular feature results in execution of a "default" code path (e.g., an "else" statement), while in other embodiments the feature is skipped and no "replacement" code is executed.

It should be appreciated that embodiments of the process 300 may thus advantageously allow for runtime enabling and disabling of particular application features by modification of the appropriate entries in the client feature table, similar to "flipping a switch" by changing the appropriate value of the appropriate column to zero or one to disable or enable the feature, respectively. By using values indexed to particular users or client facilities, embodiments allow for selective enablement of particular features in cases where clients are aware of the risks of using a beta feature, wish to assist with testing of a particular feature, or the like. Accordingly, embodiments improve selection of particular features and execution of those features in a flexible, robust manner that does not require recompiling or rebuilding of application binaries, libraries, or the like.

Figure 4:
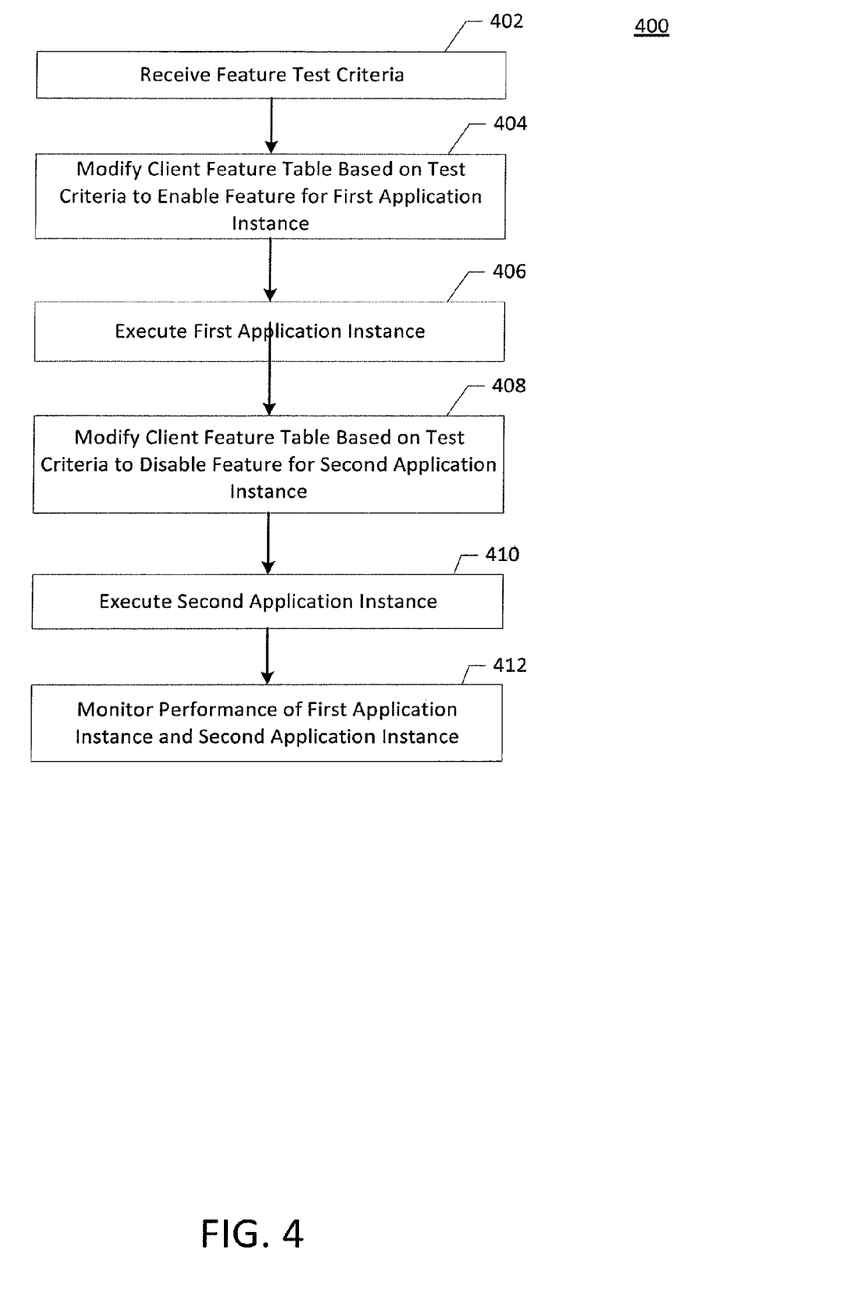
FIG. 4 is an illustration depicting a flow diagram of a process for performing application testing and feature benchmarking using a framework for selective execution of application features in accordance with example embodiments of the present invention.

FIG. 4 is a flow diagram illustrating an example of a process 400 for using a framework for selective enablement of application features as a testing platform in accordance with example embodiments of the present invention. The process 400 is operable to cause execution of two or more parallel application execution contexts (either using the same process or different processes) with the same built code, but with different features enabled for each execution path (e.g., through the use of different user or client facility credential information). The process 400 may further assist with monitoring, tracking, and analytics of those parallel application execution contexts to compare and contrast the impact of particular features enabled in one or more execution paths but disabled in other application execution paths. The process 400 may be performed, for example, by an apparatus such as the apparatus 100 described above with respect to FIG. 1, through the use of an application execution framework 202 (e.g., as part of or in conjunction with a testing component 218) as described above with respect to FIG. 2.

At action 402, a particular set of test criteria is received. The set of test criteria may include, for example, particular user or client facility credential information, particular feature information for enabling or disabling particular features, or the like. At action 404, the client feature table may be modified by the process 400 based on the test criteria to enable or disable appropriate features under test within the client feature table for a first application instance (e.g., application execution context) initiated by the process 400. In some embodiments, the process 400 may interact with a feature management component to perform edits to a client feature table as described herein. At action 406, the first application instance is executed.

At action 408, the process 400 modifies the client feature table based on the test criteria to disable a feature for a second application instance (e.g., a second application execution context). Modification of the client feature table may also be performed through interaction with a feature management component as indicated above with respect to action 404. At action 410, the second application instance may be executed. It should be appreciated that, although execution of the first application instance and the second application instance is described in series in the instant example, embodiments may also include simultaneous or near simultaneous execution of the application instances. Embodiments may further include execution of various other application instances with the same or alternative feature sets enabled or disabled. It should also be appreciated that the first application instance and the second application instance may be the same version of a given binary, such that the only difference in the respective applications is whether the particular feature or features is/are enabled or disabled.

At action 412, each application instance is monitored. As noted above, performance monitoring of the application instances may include debugging, performance analysis, verification of test scripts, verification of application output, and various other testing techniques to compare and contrast the performance of each application instance.

It will be understood that each element of the flowcharts, and combinations of elements in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus employing an embodiment of the present invention and executed by a processor 102 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for providing a framework for selective enablement of application features, the method comprising:
receiving, via an electronic communications interface, client credential information indicating at least one user or client facility;
executing a first instance of an application by a processor, the first instance of the application comprising at least one application feature selectively enabled or disabled by the framework, wherein the at least one application feature comprises a section of application code wrapped by a particular set of wrapper functions;
determining, during execution of the first instance of the application, a feature identifier associated with the at least one application feature;
retrieving feature information from a client feature table using at least the client credential information;
determining, based on the feature identifier and the feature information, whether the at least one application feature is enabled for an application execution context associated with the at least one user or client facility; and
in response to determining that the at least one application feature is enabled for the at least one user or client facility, causing the at least one application feature to be executed.

2. The method of claim 1, further comprising:
retrieving metadata information associated with the at least one application feature from a feature metadata table;
determining a column of the client feature table based at least in part on the at least one application feature metadata; and
accessing data stored in the column of the client feature table when determining whether the at least one application feature is enabled for the at least one user or client facility.

3. The method of claim 1, further comprising:
retrieving metadata information associated with the at least one application feature from a feature metadata table;
determining, based upon the metadata information, that the at least one application feature is not a beta feature; and
executing the at least one application feature in response to determining that the at least one application feature is not a beta feature.

4. The method of claim 1, further comprising:
determining, a first time, whether the at least one application feature is enabled during execution of the first instance of the application, where a first result of the determining is that the at least one application feature is not enabled;
disabling the feature in response to determining that the at least one application feature is not enabled during execution of the first instance of the application; and
determining, a second time, whether the at least one application feature is enabled during execution of the first instance of the application, where a second result of the determining is that the at least one application feature is enabled.

5. The method of claim 1, wherein the client facility is a healthcare facility.

6. The method of claim 1, further comprising editing the client feature table to enable or disable the at least one application feature without rebuilding the application.

7. The method of claim 1, further comprising:
editing, by a testing component, the client feature table to enable the at least one application feature for the first instance of the application;
editing, by the testing component, the client feature table to disable the at least one application feature for a second instance of the application; and
executing the second instance of the application such that the at least one application feature is disabled for the second instance of the application.

8. An apparatus for providing a framework for selective enablement of application features, the apparatus comprising:
application circuitry configured to:
execute a first instance of an application, the first instance of the application comprising at least one application feature selectively enabled or disabled by the framework, wherein the at least one application feature comprises a section of application code wrapped by a particular set of wrapper functions; and
feature management circuitry configured to:
receive, via an electronic communications interface, client credential information indicating at least one user or client facility;
determine, during execution of the first instance of the application, a feature identifier associated with the at least one application feature;
retrieve feature information from a client feature table using at least the client credential information;
determine, based on the feature identifier and the feature infori ation, whether the at least one application feature is enabled for an application execution context associated with the at least one user or client facility; and
in response to determining that the at least one application feature is enabled for the at least one user or client facility, cause the at least one application feature to be executed.

9. The apparatus of claim 8, wherein the feature management circuitry is further configured to:
retrieve metadata information associated with the application feature from a feature metadata table;
determine a column of the client feature table based at least in part on the application feature metadata; and
access data stored in the column of the client feature table when determining whether the at least one application feature is enabled for the at least one user or client facility.

10. The apparatus of claim 8, wherein the feature management circuitry is further configured to:
retrieve metadata information associated with the application feature from a feature metadata table;
determine, based upon the metadata information, that the application feature is not a beta feature; and
execute the at least one application feature in response to determining that the at least one application feature is not a beta feature.

11. The apparatus of claim 8, wherein the feature management circuitry is further configured to:
determine, a first time, whether the at least one application feature is enabled during execution of the first instance of the application, where a first result of the determining is that the at least one application feature is not enabled;
disable the application feature in response to determining that the at least one application feature is not enabled during execution of the first instance of the application; and
determine, a second time, whether the at least one application feature is enabled during execution of the first instance of the application, where a second result of the determining is that the at least one application feature is enabled.

12. The apparatus of claim 8, wherein the client facility is a healthcare facility.

13. The apparatus of claim 8, wherein the feature management circuitry is further configured to edit the client feature table to enable or disable the at least one application feature without rebuilding the application.

14. The apparatus of claim 8, wherein the apparatus comprises testing circuitry configured to:
edit the client feature table to enable the at least one application feature for the first instance of the application;
edit the client feature table to disable the at least one application feature for a second instance of the application; and
execute the second instance of the application such that the at least one application feature is disabled for the second instance of the application.

15. A non-transitory computer readable storage medium comprising instructions that, when executed by a processor, configure a processor to:
receive client credential information indicating at least one user or client facility;
execute a first instance of an application, the first instance of the application comprising at least one application feature selectively enabled or disabled by the framework, wherein the at least one application feature comprises a section of application code wrapped by a particular set of wrapper functions;
determine, during execution of the first instance of the application, a feature identifier associated with the at least one application feature;
retrieve feature information from a client feature table using at least the client credential information;
determine, based on the feature identifier and the feature information, whether the at least one application feature is enabled for an application execution context associated with the at least one user or client facility; and
in response to determining that the at least one application feature is enabled for the at least one user or client facility, cause the at least one application feature to be executed.

16. The computer readable storage medium of claim 15, further comprising instructions that configure the processor to:
retrieve metadata information associated with the at least one application feature from a feature metadata table;
determine a column of the client feature table based at least in part on the at least one application feature metadata; and
access data stored in the column of the client feature table when determining whether the at least one application feature is enabled for the at least one user or client facility.

17. The computer readable storage medium of claim 15, further comprising instructions that configure the processor to:
retrieve metadata information associated with the at least one application feature from a feature metadata table;
determine, based upon the metadata information, that the at least one application feature is not a beta feature; and
execute the at least one application feature in response to determining that the at least one application feature is not a beta feature.

18. The computer readable storage medium of claim 15, further comprising instructions that configure the processor to:
determine, a first time, whether the at least one application feature is enabled during execution of the first instance of the application, where a first result of the determining is that the at least one application feature is not enabled;
disable the at least one application feature in response to determining that the at least one application feature is not enabled during execution of the first instance of the application; and
determine, a second time, whether the at least one application feature is enabled during execution of the first instance of the application, where a second result of the determining is that the at least one application feature is enabled.

19. The computer readable storage medium of claim 15, wherein the client facility is a healthcare facility.

20. The computer readable storage medium of claim 15, further comprising instructions that configure the processor to edit the client feature table to enable or disable the at least one application feature without rebuilding the application.

* * * * *

UNITED STATES PATENT AND TRADEMARK OFFICE
CERTIFICATE OF CORRECTION

PATENT NO. : 9,639,345 B2  
APPLICATION NO. : 14/674256  
DATED : May 2, 2017  
INVENTOR(S) : Axtell et al.

Page 1 of 1

It is certified that error appears in the above-identified patent and that said Letters Patent is hereby corrected as shown below:

In the Claims

Column 18,
Line 60, "infori ation," should read --information,--.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*